United States Patent
Suga

(10) Patent No.: US 10,021,260 B2
(45) Date of Patent: Jul. 10, 2018

(54) IMAGE READING APPARATUS AND IMAGE FORMING APPARATUS

(71) Applicant: CANON KABUSHIKI KAISHA, Tokyo (JP)

(72) Inventor: Takayuki Suga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/372,022

(22) Filed: Dec. 7, 2016

(65) Prior Publication Data

US 2017/0180579 A1 Jun. 22, 2017

(30) Foreign Application Priority Data

Dec. 21, 2015 (JP) ................. 2015-248206

(51) Int. Cl.
*H04N 1/04* (2006.01)
*H04N 1/00* (2006.01)
*H04N 1/10* (2006.01)

(52) U.S. Cl.
CPC ..... *H04N 1/00801* (2013.01); *H04N 1/00559* (2013.01); *H04N 1/00708* (2013.01); *H04N 1/1013* (2013.01); *H04N 2201/0081* (2013.01); *H04N 2201/0091* (2013.01)

(58) Field of Classification Search
CPC ........... H04N 1/00801; H04N 1/00559; H04N 1/00708; H04N 1/1013
USPC .................................................. 358/475, 474
See application file for complete search history.

(56) References Cited

U.S. PATENT DOCUMENTS

| 7,420,716 | B2 | 9/2008 | Aoyama et al. ............... 358/474 |
| 7,463,392 | B2 | 12/2008 | Yamamoto et al. .......... 358/496 |
| 7,515,312 | B2 | 4/2009 | Murakami et al. ........... 358/461 |
| 7,715,060 | B2 | 5/2010 | Suga et al. .................... 358/474 |
| 7,755,812 | B2 | 7/2010 | Oshida et al. ................ 358/496 |
| 8,064,105 | B2 | 11/2011 | Murakami et al. ........... 358/461 |
| 8,134,755 | B2 | 3/2012 | Suga ............................ 358/474 |
| 9,060,086 | B2 * | 6/2015 | Takahashi .......... H04N 1/00578 |
| 9,554,010 | B2 | 1/2017 | Suga et al. ............. H04N 1/024 |
| 2004/0009005 | A1 | 1/2004 | Suga et al. ..................... 399/94 |
| 2007/0188825 | A1 | 8/2007 | Suga ............................ 358/474 |

FOREIGN PATENT DOCUMENTS

| JP | 2005-024989 | 1/2005 |
| JP | 2014-003396 | 1/2014 |
| JP | 2015-195500 | 11/2015 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus includes a guide member whose part in sliding-contact with a light-emitting portion is formed of synthetic resin. A control portion is configured to execute a control of changing a turn position among a plurality of positions including a first position and a second position downstream in an image reading direction of the first position in case that the light-emitting portion irradiates the first size sheet with light to read an image thereof.

14 Claims, 7 Drawing Sheets

SUB-SCAN DIRECTION

IMAGE READING APPARATUS AND IMAGE FORMING APPARATUS

BACKGROUND OF THE INVENTION

Field of the Invention

The present disclosure relates to an image reading apparatus and an image forming apparatus and more specifically to a configuration for preventing deterioration of reading accuracy of an image reading portion over time.

Description of the Related Art

Hitherto, an image reading apparatus such as an image scanner is configured to read an image of a document in a condition being placed on a platen glass as a transparent member. Still further, a conventional image forming apparatus such as a digital copier and a printer includes an image forming portion and an image reading apparatus and is configured to form an image onto a sheet by the image forming portion based on image information read by the image reading apparatus.

The image reading apparatus includes an image reading portion including a light source movably in a sub-scan direction. Then, in reading the image of the document, the image reading apparatus moves the image reading portion in the sub-scan direction, irradiates the document with light from the light source and detects reflection light from the document.

As such an image reading apparatus, there is one provided with a resin-made guide shaft and a rail integrated with a resin-made casing and configured to move the image reading portion along the guide shaft and the rail in reading an image as disclosed in Japanese Patent Application Laid-open No. 2014-3396 for example.

By the way, in the image reading apparatus as disclosed in Japanese Patent Application Laid-open No. 2014-3396, the image reading portion located at a reading starting position is moved to an image reading ending position in reading the image, and then the image reading portion which has moved to the image reading ending position is returned to the reading starting position after ending to read the image. That is, in the image reading apparatus described above, the image reading portion reciprocates between the reading starting position and the image reading ending position along the resin-made guide shaft and the rail in reading the image.

However, in the case of the configuration in which the image reading portion is moved along the guide shaft and the rail, parts of the resin-made guide shaft and rail corresponding to a moving range of the image reading portion causes wear over time. For instance, in a case where a document whose size is smaller than a maximum size document that can be read by the image reading apparatus is read repeatedly, a moving range of the guide shaft and the rail between the reading starting position and the image reading ending position corresponding to the small size document causes wear.

If the guide shaft and the rail wear over time as described above, a difference in level is generated at the image reading ending position of the guide shaft and the rail corresponding to the small size document, i.e., at the position where the image reading portion stops. Here, because a distance between the reading starting position and the image reading ending position corresponding to a large size document is longer than that of the small size document, the image reading portion passes through the image reading ending position of the small size document until when the image reading portion arrives at the image reading ending position in reading the large size document image. If the difference in level is generated at the image reading ending position corresponding to the small size document, the image reading portion hits against the difference in level, and the document image reading accuracy of the image reading portion deteriorates due to an impact.

SUMMARY OF THE INVENTION

According to one aspect of the present disclosure, an image reading apparatus includes a light-emitting portion configured to irradiate a sheet with light to read an image on the sheet while moving in an image reading direction, a moving portion configured to move the light-emitting portion, a guide member configured to guide the move of the light-emitting portion in the image reading direction while being in sliding-contact with the light-emitting portion, a part of the guide member in sliding-contact with the light-emitting portion being formed of synthetic resin, and a control portion configured to control the moving portion such that the light-emitting portion moves in the image reading direction in case that the light-emitting portion irradiates the sheet with light to read the image and the light-emitting portion which has reached a turn position moves in a direction opposite to the image reading direction. The light-emitting portion is capable of irradiating a first size sheet and a second size sheet with light to read the image, a length of the second size sheet being longer than the first size sheet in the image reading direction. The control portion is configured to execute a control of changing the turn position among a plurality of positions including a first position and a second position downstream in the image reading direction of the first position in case that the light-emitting portion irradiates the first size sheet with light to read the image thereof. The control portion is configured to execute a control of turning the light-emitting portion at a position downstream in the image reading direction of the first position in case that the light-emitting portion irradiates the second size sheet with light to read the image thereof.

Further features of the present invention will become apparent from the following description of exemplary embodiments with reference to the attached drawings.

DESCRIPTION OF THE EMBODIMENTS

Figure 1:
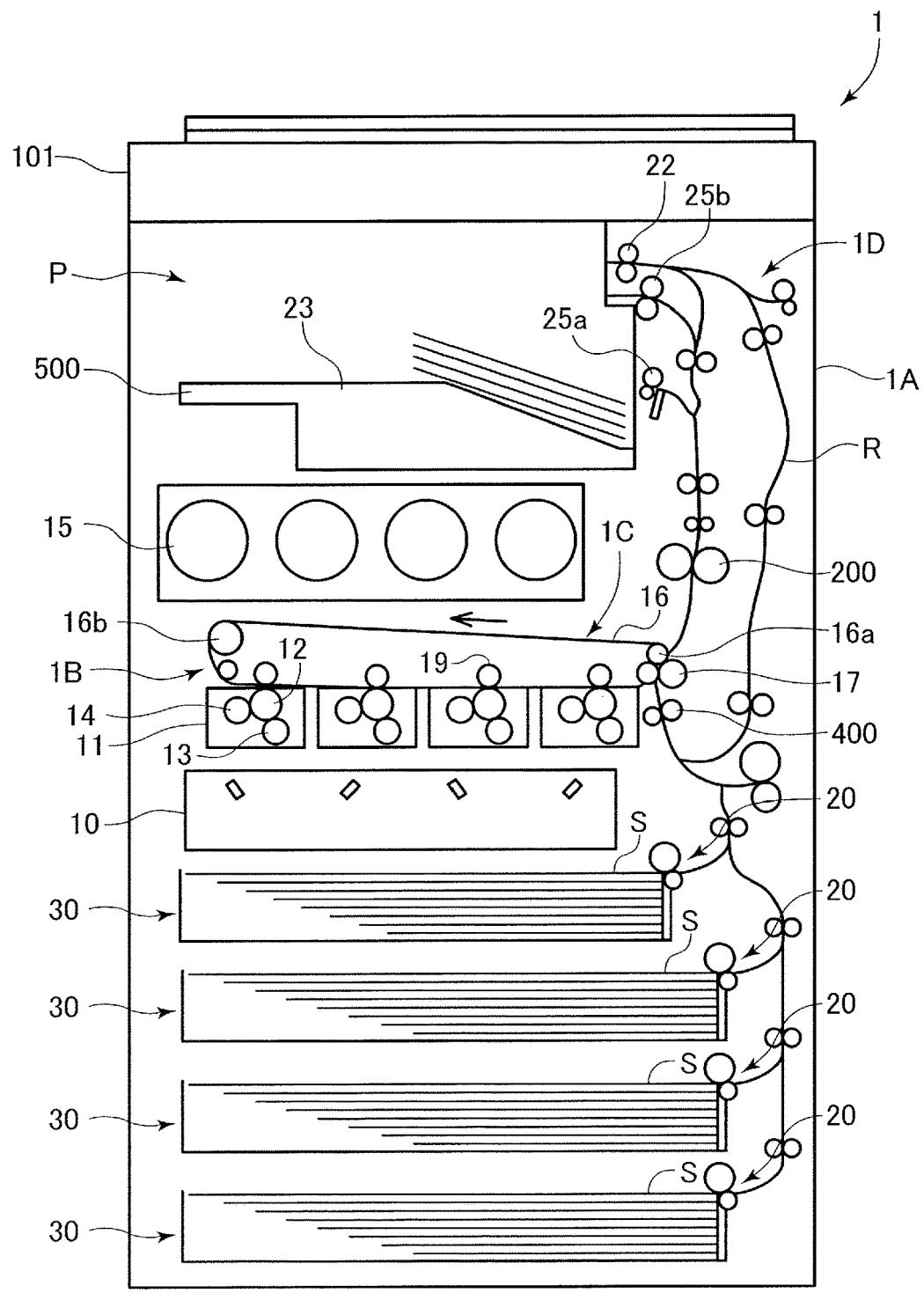
FIG. 1 is a schematic diagram illustrating a configuration of a copier which is one exemplary image forming apparatus including an image reading apparatus of a first embodiment of the present disclosure.

Embodiments of the present disclosure will be described in detail below. FIG. 1 is a schematic diagram illustrating a configuration of a copier which is one exemplary image forming apparatus including an image reading apparatus of a first embodiment of the present disclosure. As illustrated in FIG. 1, the image reading apparatus 101 is disposed at an upper part of an apparatus body 1A of the copier 1. Provided at a lower part of the image reading apparatus 101 are an image forming portion 1B forming an image on a sheet S based on document image information read by the image reading apparatus 101 and a sheet feeder 20 feeding the sheet S stored in a sheet feed cassette 30 to the image forming portion 1B.

The image forming portion 1B includes a laser scanner 10 and four process cartridges 11 configured to form four color toner images of yellow (Y), magenta (M), cyan (C), and black (K), respectively. Here, each process cartridge 11 includes a photosensitive drum 12, an electrifier 13, a developer 14, and others.

The image forming portion 1B also includes an intermediate transfer unit 1C provided above the process cartridges 11. The intermediate transfer unit 1C includes an intermediate transfer belt 16 wrapped around a driving roller 16a and a tension roller 16b and primary transfer rollers 19 provided within an loop of the intermediate transfer belt 16 and being in contact with the intermediate transfer belt 16 at positions facing the photosensitive drums 12. Provided at a position facing the driving roller 16a in the intermediate transfer unit 1C is a secondary transfer roller 17 composing a secondary transfer portion transferring a color image formed on the intermediate transfer belt 16 to the sheet S.

A fixing portion 200 is disposed above the secondary transfer roller 17, and a first discharge roller pair 25a, a second discharge roller pair 25b, and a double face reversing portion 1D are disposed at an upper left part of the fixing portion 200. The double face reversing portion 1D includes a reversing roller pair 22 rotatable in normal and reverse directions and a re-conveyance path R conveying a sheet on which an image has been formed on one surface thereof again to the image forming portion 1B.

Next, an image forming operation of the copier 1 constructed as described above will be described. When the image reading apparatus 101 reads image information of a document at first, the image information undergoes image process and is converted into electrical signals to be transmitted to a laser scanner 10 of the image forming portion 1B. Then, in the image forming portion 1B, a surface of the photosensitive drum 12 of each process cartridge 11 is scanned by a laser beam corresponding to the image information of yellow, magenta, cyan or black component color emitted from the laser scanner 10. Thereby, the surface of the photosensitive drum 12 which has been homogeneously electrified with predetermined polarity and potential by the electrifier 13 is sequentially exposed, and electrostatic latent images of yellow, magenta, cyan, and black are sequentially formed respectively on the photosensitive drums of the respective process cartridges 11.

After that, the electrostatic latent images are developed and visualized by toners of the respective colors of yellow, magenta, cyan, and black. Then, the respective color toner images on the respective photosensitive drums are sequentially superimposed and transferred onto the intermediate transfer belt 16 by primary transfer bias applied to the primary transfer roller 19. As a result, a toner image is formed on the intermediate transfer belt 16.

In parallel with the toner image forming operation, the sheet S is delivered out of the sheet feeder 20, and is conveyed to a registration roller pair 400. A skew of the sheet is corrected by the registration roller pair 400, and is then conveyed to the secondary transfer portion. The toner image is transferred collectively onto the sheet S by the secondary transfer bias applied to the secondary transfer roller 17 in the secondary transfer portion.

Next, the sheet S onto which the toner image has been transferred is conveyed to the fixing portion 200. The respective color toners melt, are mixed and are fixed as a color image on the sheet S by receiving heat and pressure in the fixing portion 200. After that, the sheet S onto which the image has been fixed is discharged by the first discharge roller pair 25a to a sheet discharge space P and is stacked on a stacking portion 23 projecting on a bottom surface of the sheet discharge space P.

In a case of forming images on both surfaces of the sheet S, the sheet S on one surface of which the image has been formed is conveyed to a re-conveyance path R by the normal and reverse rotations of the reversing roller pair 22 after passing through the fixing portion 200 and is conveyed again to the registration roller pair 400. Then, after forming and fixing the image again onto a back surface, the sheet S is discharged by the first discharge roller pair 25a to the sheet discharge space P and is stacked on the stacking portion 23.

Figure 2:
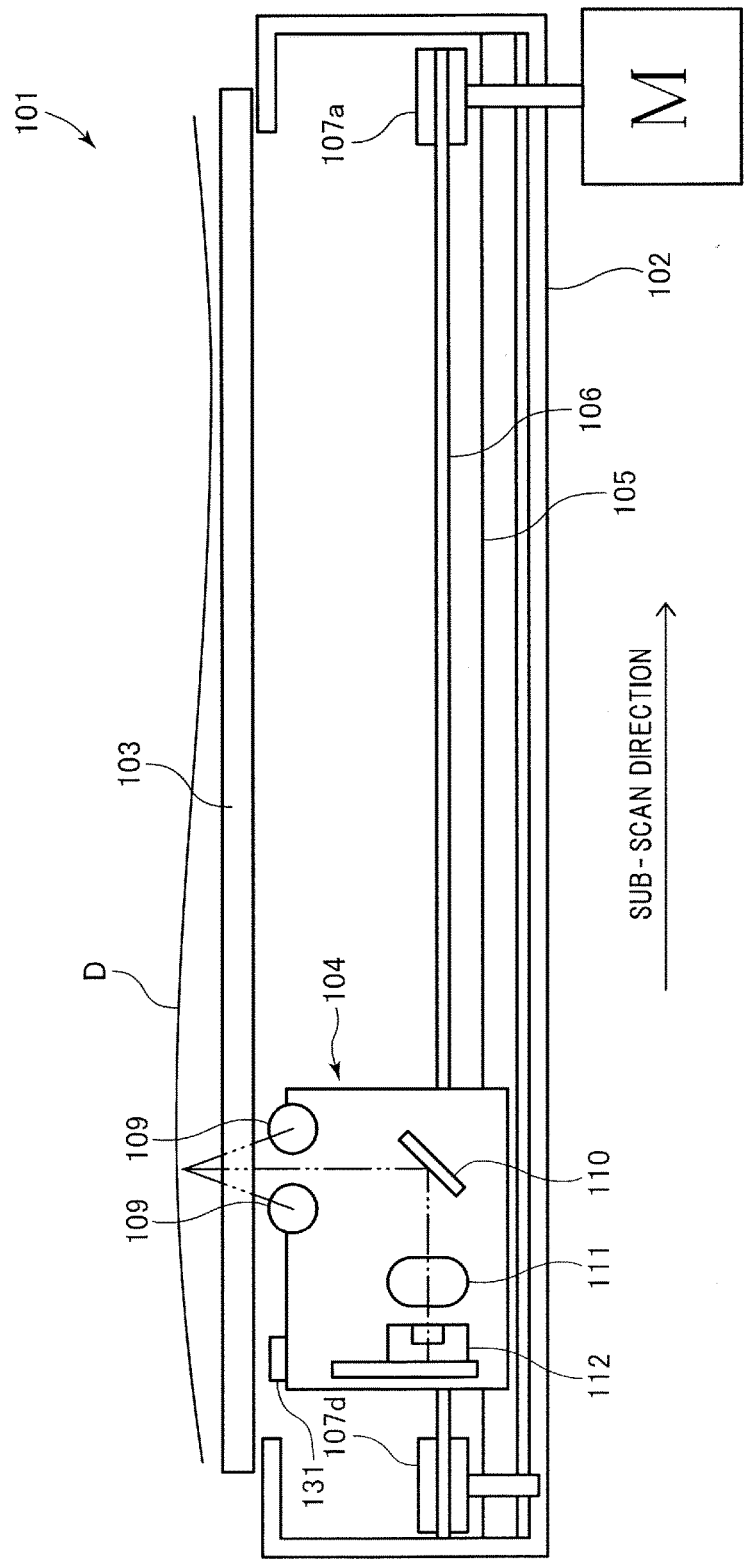
FIG. 2 is a section view schematically illustrating a configuration of the image reading apparatus.

FIG. 2 is a section view schematically illustrating a configuration of the image reading apparatus 101. A platen glass 103, i.e., one example of a transparent member, on which a document D, i.e., one example of a sheet of plural sizes, can be placed is provided on an upper surface of a frame 102 which is a part of the apparatus body of the image reading apparatus 101. Provided under the platen glass 103 is a carriage 104 which serves as the image reading portion reading an image of the document D placed on the platen glass 103.

The carriage 104 moves in the sub-scan direction, i.e., one example of an image reading direction, to read the image of the document D in reading the image. The carriage 104 includes a light source 109 irradiating the document D with light, a reflection mirror 110 into which the light reflected and diffused by the document D after the irradiation enter, and a lens 111 imaging the light reflected by the reflection mirror 110. The carriage 104 also includes a light receiving element 112 photo-electrically converting and reading the light imaged by the lens 111 and a home position sensor 131 detecting that the carriage 104 has moved to a home position, i.e., one example of the reading starting position. In the present embodiment, the carriage 104 composes a light emitting portion irradiating the sheet with light to read the image of the sheet while moving in the image reading direction.

Figure 3:
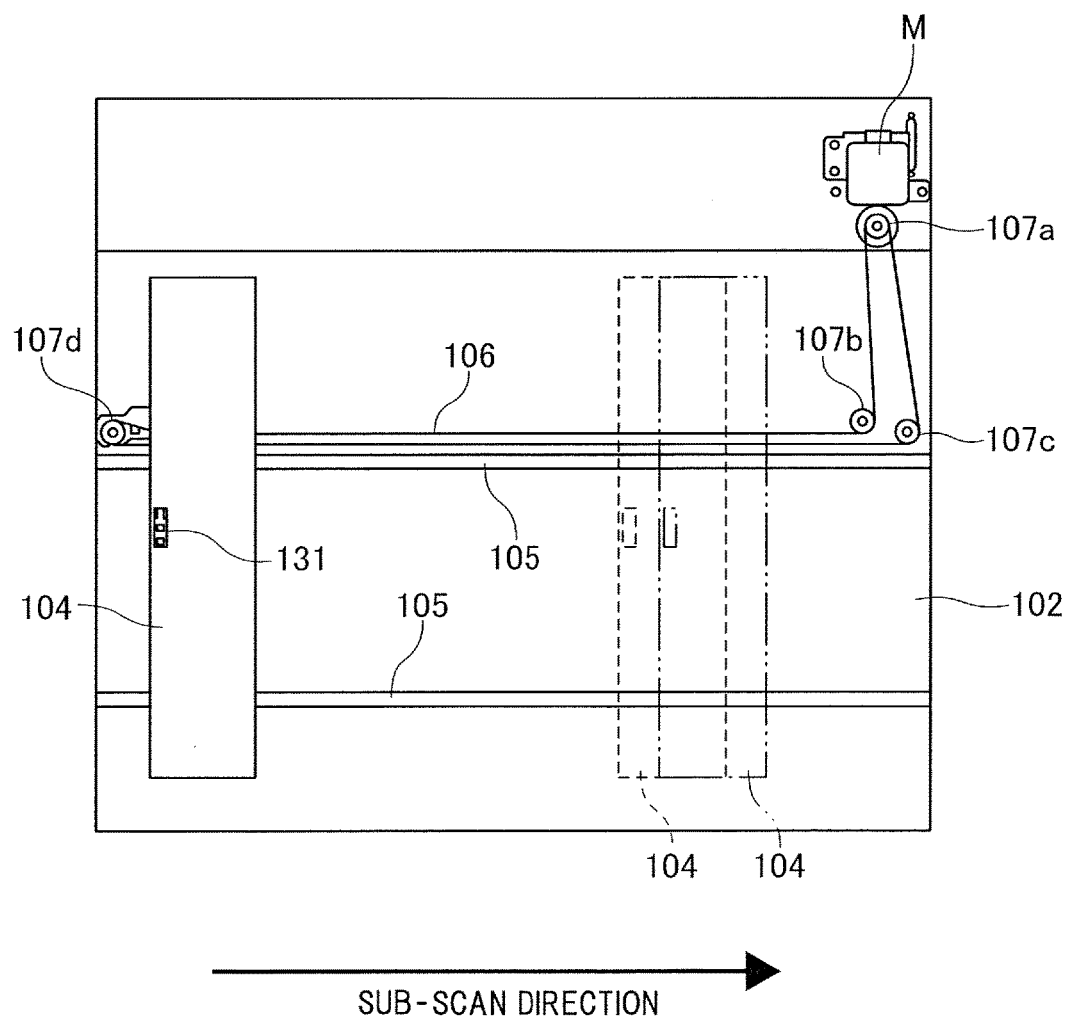
FIG. 3 is a plan view schematically illustrating the configuration of the image reading apparatus.

The move of the carriage 104 in the sub-scan direction is guided by two guide members 105 provided in parallel with the sub-scan direction as illustrated in FIG. 3. The carriage 104 is also attached to a driving belt 106 wrapped around a driving pulley 107a and driven pulleys 107b through 107d. Then, the carriage 104 moves by being guided by the guide member 105 while being in sliding-contact with the guide member 105 by turning the driving pulley 107a by a motor M capable of rotating normally and reversely. Here, in the present embodiment, the frame 102 and the guide member 105 are formed integrally by resin due to recent requirements of lightening and lowering costs of the apparatus. Specifically, the frame 102 and the guide member 105 are formed of PC-ABS. Besides that, resins such as ABS, HIPS, PC, and PPE and these resins into which glass fibers and non-organic fillers are doped may be used. That is, the guide member 105 guides the move of the light-emitting portion 104 in the image reading direction while being in sliding-contact with the light-emitting portion 104 and a part thereof in sliding-contact with the light-emitting portion 104 is made of synthetic resin. It is noted that while an entire part of the guide member 105 described above is formed of resin, a resin coating may be applied on a metal shaft to increase slidability. That is, the guide member 105 may be formed such that at least the part in sliding-contact with the light-emitting portion 104 is formed of resin.

Figure 4:
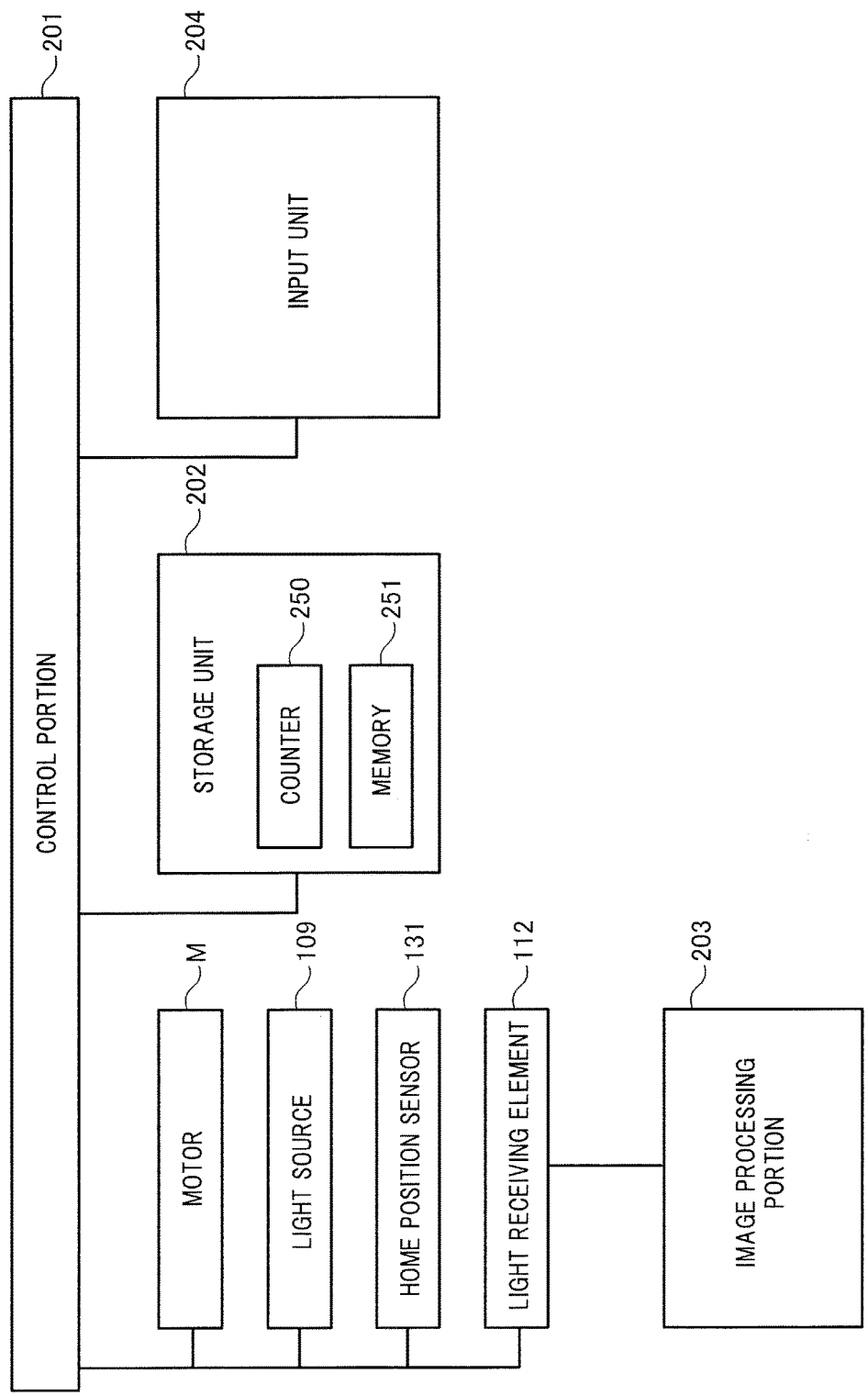
FIG. 4 is a control block diagram of the image reading apparatus.

FIG. 4 is a control block diagram of the image reading apparatus 101. A control portion 201 executes such controls of driving the motor M, i.e., one example of the moving portion, moving the carriage 104, and of lighting the light source 109. That is, the control portion 201 controls the moving portion M and others moving the light-emitting portion 104. The control portion 201 moves the light-emitting portion 104 in the image reading direction in irradiating the sheet with light to read an image and moves the light-emitting portion 104 which has reached a turn position in a direction oppose to the reading direction. The control portion 201 is also connected with a home position sensor 131, a light receiving element 112, and an image processing portion 203 which implements predetermined processing on electrical signals of an image obtained by the light receiving element 112.

The control portion 201 is also connected with a storage unit 202 and an input unit 204. The storage unit 202 includes a counter 250 which serves as a counter portion counting a number of scan times, i.e., one example of a number of image reading times, of the carriage 104 and a memory 251 which serves as a storage portion storing a scan range of the carriage 104 per document size (sheet size) to be scanned. Here, the scan range is determined as a sum of an acceleration distance, a constant-speed distance, and a deceleration distance of the carriage 104 and is a distance from the home position of the carriage 104 to the stop position where the carriage 104 stops. The acceleration distance is a moving distance of the carriage 104 while the speed of the carriage 104 is accelerated. The constant-speed distance is a moving distance of the carriage 104 while the speed of the carriage 104 is constant. The deceleration distance is a moving distance of the carriage 104 while the speed of the carriage 104 is decelerated. It is noted that in the present embodiment, the carriage 104, i.e., one example of the light-emitting portion, moves in the image reading direction in reading the image and then after stopping once at the stop position, turns its direction and moves in a direction opposite to the image reading direction. Therefore, the stop position described above maybe also referred to as a turn position of the carriage 104. Then, the memory 251 stores the stop position where the carriage 104 is stopped as a scan range corresponding to a document size. In other words, the memory 251 may be also referred as a storage portion storing information on the turn position. According to the present embodiment, this turn position includes a first position, a second position downstream in the image reading direction of the first position, and a third position downstream in the image reading direction of the first position as specifically described later. It is noted that the 'stop' state described above includes a state in which the light-emitting portion 104 stops instantly at least when the light-emitting portion 104 turns.

An operator of the apparatus inputs a document size, a ratio for magnifying/reducing an image that has been read, reading resolution, and others through the input unit 204. The input unit 204 is a size information acquiring portion for acquiring information on a sheet size and is, specifically, a control panel provided on a front surface of the image reading apparatus 101. Then, the control portion 201 determines the stop position of the carriage 104 from the information of the document size inputted through the input unit 204, the stop position stored in the storage unit 202, and a number of scan times counted by a counter 250.

Next, an image reading operation executed by the image reading apparatus 101 will be described. In a case of reading an image of a document placed on the platen glass 103, firstly the control portion 201 determines a reading area of the carriage 104, i.e., the stop position of the carriage 104, based on the information inputted through the input unit 204. It is noted that how the carriage 104 determines the stop position of the carriage 104 will be described later.

Next, the light source 109 is lit and the motor M is normally driven to move the carriage 104 from the home position in the sub-scan direction with a predetermined speed. Thereby, the carriage 104 moves corresponding to the reading area determined by the information inputted from the input unit 204 while irradiating the document with light from the light source 109.

Here, the light emitted from the light source 109 is reflected and diffused by the surface of the document during the move of the carriage 104, and a part thereof is imaged on the light receiving element 112 after being led to the lens 111 by the reflection mirror 110. The light receiving element 112 implements photoelectric conversion on the imaged light and transmits obtained electrical signals to the image processing portion 203. The image information of the document can be obtained by implementing a predetermined image processing in the image processing portion 203. Then, as described above, the laser scanner 10 scans the surfaces of the photosensitive drums 12 based on the image information to form the yellow, magenta, cyan, and black electrostatic latent images respectively on the photosensitive drums 12.

Next, when the reading operation ends and the carriage 104 moves to the stop position, the control portion 201 stops the motor M to stop the carriage 104. After that, the control portion 201 reversely drives the moving portion M and then stops the moving portion M by detecting that the carriage 104 has returned to the home position from a signal from the home position sensor 131. Thereby, the carriage 104 returns to the home position to be ready to read a next document image.

By the way, in the present embodiment, the stop position where the carriage 104 that has read an image is stopped includes a first stop position (reference stop position) corresponding to the document size and a second stop position (downstream stop position) located downstream in the image reading direction of the first stop position. That is, these first and second stop positions are first and second positions where the carriage 104 described above is turned. These two stop positions are stored in the memory 251 as the first and second stop positions. Then, when the image reading operation ends, the control portion 201 stops the carriage 104 selectively at the first stop position or the second stop position based on the count information obtained from the counter 250. That is, the control portion 201 changes the turn positions among the plurality of positions based on the count information.

It is noted that in the present embodiment, the image reading apparatus 101 is configured to able to read the image of the document of the first size and the image of the document of readable maximum size which is the document of the second size whose length in the image reading direction is longer than that of the first size document. That is, the carriage 104 serving also as the light-emitting portion is configured to be able to irradiate the first size sheet and the second size sheet with light. A length in the image reading direction of the second size sheet is longer than that of the first size. Then, the carriage 104 is configured to be able to stop at the first and second stop positions in reading the image of the first size document. The carriage 104 is also configured to be able to stop only at one stop position in reading the image of the readable maximum size document. The memory 251 stores also this third position, i.e., one example of the stop position (turn position) corresponding to the maximum size document. It is noted that the first position is set within the reading area of the second size sheet, and the third position is set downstream in the image reading direction of the first position.

Figure 5:
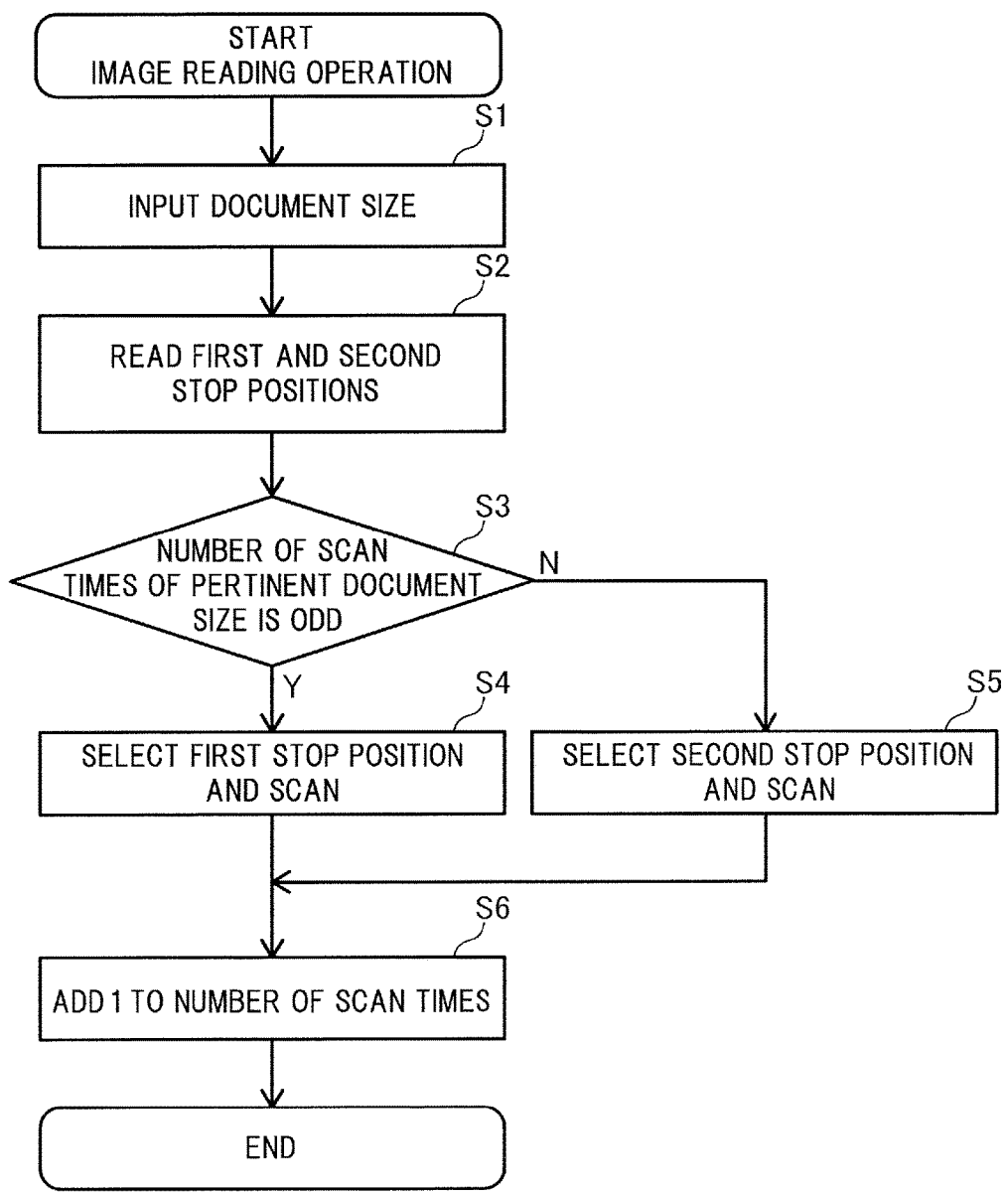
FIG. 5 is a flowchart illustrating a control of changing a stop position executed by a control portion of the image reading apparatus.

Next, a control of changing the stop position (stop control) executed by the control portion 201 will be described with reference to a flowchart shown in FIG. 5. As illustrated in FIG. 5, if a document size is inputted through the input unit 204 in Step S1, the control portion 201 reads two stop positions corresponding to the document size stored in the storage unit 202 in Step S2 before starting an image reading operation.

Next, the control portion 201 reads a number of scan times (number of image reading times) of the pertinent size document which is a count information counted by the counter 250 of the storage unit 202 and judges whether or not the number of times of scanning conducted before the image reading operation is an odd number of times in Step S3. Then, if the number of scan times is an odd number of times, i.e., Yes in Step S3, the control portion 201 selects the first stop position among the two stop positions set in advance and conducts scanning of the carriage 104 in Step S4. If the image reading operation thus ends, the carriage 104 returns to the home position after stopping at the first stop position indicated by a broken line in FIG. 3 described above.

Still further, in a case where the number of scan times is not the odd number of times, i.e., No in Step S3 and the number of scan times is an even number of times, the control portion 201 selects the second stop position among the two stop positions set in advance and conducts scanning of the carriage 104 in Step S5. When the image reading operation thus ends, the carriage 104 returns to the home position after stopping at the second stop position indicated by a two dot chain line in FIG. 3 as described above. Then, when one time of the image reading operation ends, the control portion 201 increments 1 to the number of scan times stored in the counter 250 in Step S6. Thereby, the carriage 104 stops at the stop position different from the previous one in performing a next image reading operation. Thus, the control portion 201 controls the motor M such that the carriage 104 stops alternately at the two stop positions set corresponding to the document size every time when the control portion 201 conducts the document reading operation.

Here, the guide member 105 guiding the carriage 104 is formed of resin as described above and wears by rubbing with the carriage 104 when the carriage 104 moves in conducting the reading operation. However, in the case when two stop positions are provided like the present embodiment, the carriage 104 has different moving ranges from the home position to the stop position even in reading the same document image. Therefore, it is possible to widen a wear range of the guide member 105. This arrangement makes it possible to prevent the guide member 105 from being worn down at only one place intensively over time and to prevent a difference in level from being generated at the stop position.

As described above, according to the present embodiment, the image reading apparatus is provided with the two stop positions corresponding to the document size and causes the carriage 104 to stop at different positions every time when the image reading apparatus reads a document image. That is, the image reading apparatus is configured so as to change the stop positions of the carriage 104 among the two stop positions after reading the image of the first size document having the first and second stop positions.

Thereby, a number of times when the carriage 104 stops at one stop position is reduces to a half as compared to the case where the carriage 104 stops always at one place, so that it is possible to prevent the difference in level from being generated over time at the stop position by the wear of the guide member 105. If a difference in level is formed on the guide member 105, the carriage 104 oscillates in running over the difference in level and deteriorates image reading accuracy. Therefore, it is possible to prevent the deterioration of the image reading accuracy of the carriage 104 over time by preventing the difference in level from being generated. Along with that, it is also possible to prevent deterioration of an image formed by the copier 1.

It is noted that while the two stop positions are provided corresponding to the document size in the present embodiment, the present disclosure is not limited to such configuration. For instance, the stop position set corresponding to the first size document may be employed in common in a case of reading a second size document close to a first size document. That is, the first and second stop positions may be employed in common in reading the approximate second size document. Still further, because at least one downstream stop position needs to be set, three or more stop positions may be provided. That is, the third stop position may be provided downstream in the image reading direction of the second stop position, and each of the first through third stop positions maybe employed. That is, the control portion 201 maybe configured to execute a control of changing the turn position where the carriage 104 turns among a plurality of positions including the first position and the second position downstream in the image reading direction of the first position in the case where the carriage 104 irradiates the first size sheet with light to read the image thereof. This arrangement is preferable for a product which is required to have a long service life in particular from an aspect of preventing deterioration of reading accuracy because the wear range can be dispersed more by providing the many stop positions as the turn positions.

Still further, while the control of changing the stop position each time in reading the document image has been described in the present embodiment, the present disclosure is not limited to such arrangement. It is also possible to arrange so as to change the stop position each time in reading a predetermined number of document images more than one. In other words, it is also possible to arrange so as to change the stop position each time in reading documents by a predetermined number of times, e.g., 10 times. In this case, it is preferable to change the stop position to the downstream side each time in reading 10 times. Note that it is not necessary to fix the reading number of times to change the stop position. For instance, it is possible to change the stop position after reading 1,000 times at first and then to change the stop position after reading 2,000 times.

Note that it is also possible to arrange so as to change the stop position each time in reading by a large number of times, e.g., 10,000 times, as the predetermined number of times, if it is possible to change the stop position before such a difference in level that leads to deterioration of the reading accuracy occurs due to wear. It is noted that in the case of changing the stop position by every predetermined number of times as described above, it is desirable to move the stop position in a direction in which a distance from the home position extends in order to prevent the deterioration of the reading accuracy while assuring a scan distance (moving distance) required for reading an image.

Still further, even if a difference in level is generated at the stop position, the carriage 104 will not pass over the difference in level in reading the document image of the readable maximum size in the image reading apparatus 101. Due to that, even if the stop position of the maximum size document is set to be one, no deterioration of the reading accuracy occurs by the difference in level. Due to that, it is possible to prevent the deterioration of the reading accuracy by providing the plurality of stop positions in reading an image of at least one size document smaller than the readable maximum size document. However, the control portion 201 may be arranged so as to change the turn position among the plurality of positions including the third position in the case when the carriage 104 reads the second size sheet while moving in the image reading direction.

Still further, in the case of setting the plurality of stop positions, it is also possible to arrange such that the downstream most stop position as a stop position in reading the readable maximum size documents as one stop position and to stop the carriage 104 at this stop position per every predetermined number of times. That is, although the third position may be set at a downstream position of the first and second stop positions, it may be set at the same position with the second position. In this case, the difference in level is generated at the stop position of the maximum sized document as the carriage 104 moves the whole range of the guide member 105, so that it is possible to uniform the wear of the guide member 105 and to prolong the service life of the image reading apparatus 101.

Figure 6:
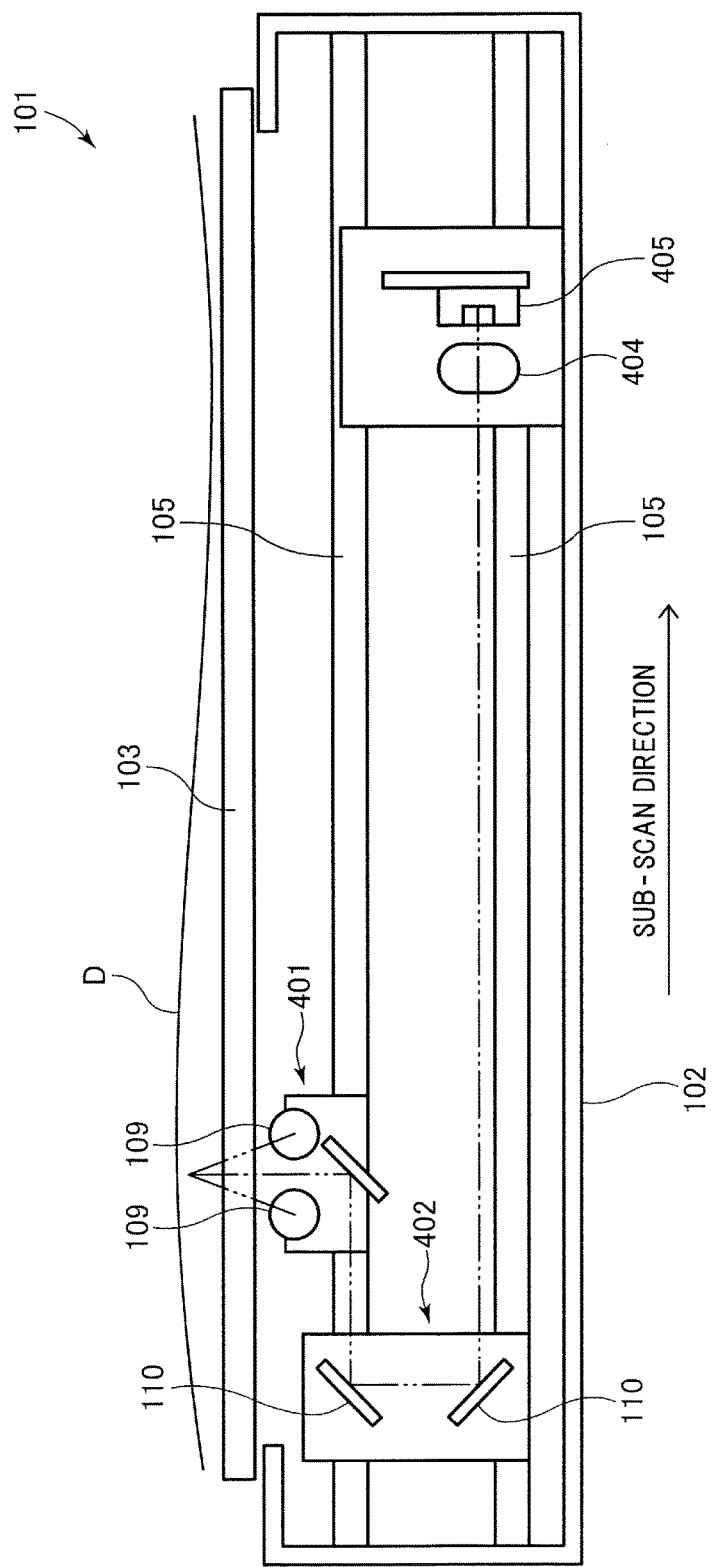
FIG. 6 is a section view illustrating another configuration of an image reading portion provided on the image reading apparatus.

It is noted that while the carriage 104 including the reflection mirror, the lens, and the light receiving element has been used as the image reading portion in the present embodiment, the configuration of the image reading portion is not limited such configuration. For instance, an image reading portion including a contact image sensor having an equal magnification image forming lens may be employed. Still further, an image reading portion including a first scan base 401 having a light source 109, a second scan base 402 having two reflection mirrors 110, and a frame 403 including a lens 404 and a light receiving element 405 fixed on the frame 403 as illustrated in FIG. 6 may be employed. It is noted that the image reading portion constructed as described above is configured such that the first scan base 401 constitutes the light-emitting portion, the first scan base 401 and the second scan base 402 are scanned with a speed ratio of 2 to 1, and an image is read by the light receiving element 405 through the lens 404 fixed on the frame 403.

Figure 7:
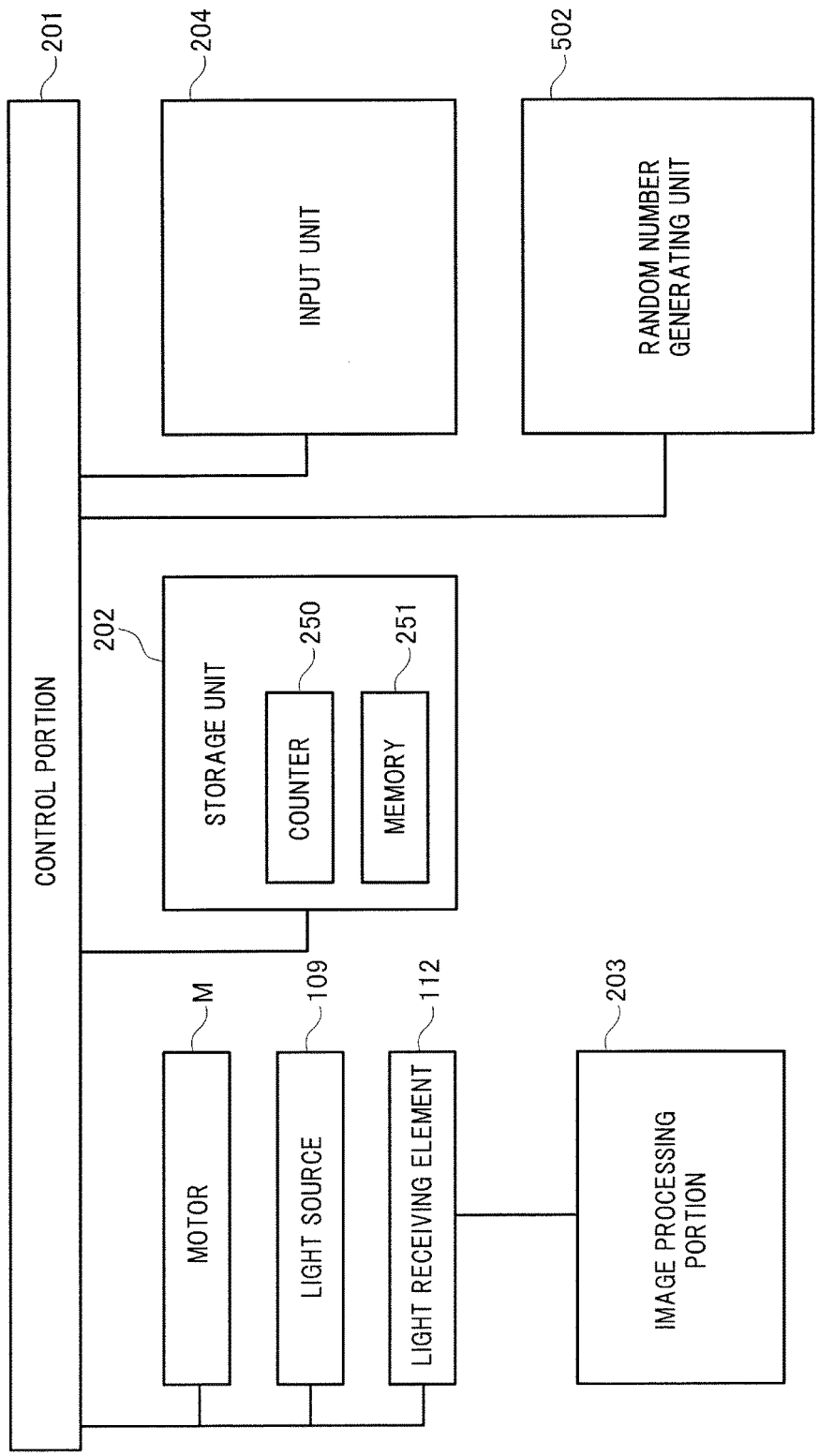
FIG. 7 is a control block diagram of an image reading apparatus of a second embodiment.

Next, a second embodiment of the present disclosure will be described. FIG. 7 is a control block diagram of an image reading apparatus 101 of the present embodiment. In FIG. 7, the same reference numerals with those already described in FIG. 3 denote the same or corresponding components.

As illustrated in FIG. 7, the control portion 201 is connected with the moving portion M, the light source 109, the light receiving element 112, the storage unit 202, the image processing portion 203, and the input unit 204 as described above and a random number generator 502 generating random numbers of integers within a predetermined range.

As described above, a scan range is determined as a sum of an acceleration distance and a constant-speed distance.

Then, according to the present embodiment, the scan range is determined by generating random numbers by the random number generator 502 and by adding a distance corresponding to the generated random numbers. It is noted that a minimum constant-speed distance is stored in the memory 251 in the present embodiment.

Next, an operation for determining a scan range made through the control portion 201 will be described. Before starting to read a document image, the control portion 201 inputs information on documents size necessary for determining a reading area from the input unit 204 and actuates the random number generator 502 to generates random numbers RN of integers within a range of 0 to 99 for example. Next, the control portion 201 adds a correction distance (RN÷100) mm based on the random numbers RN generated by the random number generator 502 to the minimum constant-speed distance required for reading.

Then, the control portion 201 determines the scan range corresponding to the document size as a sum of the constant-speed distance to which the correction distance is added, the acceleration distance, and the deceleration distance. According to this control, the scan range, i.e., the stop position of the carriage, changes every time even if the document size is equal because the constant-speed range is determined by using the random number generated every time when the image reading operation is carried out.

As described above, according to the present embodiment, the stop position of the carriage is changed by using the random number. This arrangement makes it possible to prevent a difference in level from being generated on the guide member 105 otherwise caused by the concentration of the wear range at one place of the guide member 105 formed of resin. Then, it is possible to prevent deterioration of the reading accuracy of the carriage 104 over time and along with that, to prevent deterioration of an image formed by the copier 1 by preventing the difference in level as described above.

Note that it is not necessary to generate the random number and to change the stop position per each scanning. It is also possible to control so as to generate a new random number based on count information of the counter 250 and to change the stop position per every predetermined number of times, e.g., 10 times.

Still further, while the case of changing the constant-speed distance by using the random number has been described in the present embodiment, it is possible to obtain the effect of dispersing the wear range also by changing the acceleration or deceleration distance based on the random number. Still further, while the random number has been used to change the constant-speed distance, it is also possible to arrange so as to change the constant speed distance by increasing a value of the counter stepwise, e.g., one by one, per predetermined number of times and by adding a correction distance based on this counter value to the constant speed distance.

It is noted that while the input unit 204 has been exemplified as a size information acquiring portion acquiring information on sheet size in the embodiment described above, the present disclosure is not limited to such configuration. For instance, the size information acquiring portion may be composed of an irradiation portion irradiating a document placed on the platen glass 103 with light and a light receiving element receiving a reflection light of irradiated light. In this case, the control portion 201 judges the document size based on a detection signal obtained from the light receiving element.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-248206, filed on Dec. 21, 2015, which is hereby incorporated by reference herein in its entirety.

What is claimed is:

1. An image reading apparatus comprising:
a light emitting device configured to irradiate a sheet with light to read an image on the sheet while moving in an image reading direction;
a motor configured to move the light emitting device;
a guide member configured to guide the move of the light emitting device in the image reading direction while being in sliding-contact with the light emitting device, a part of the guide member in sliding-contact with the light emitting device being formed of synthetic resin; and
a controller configured to control the motor such that the light emitting device moves in the image reading direction in case that the light emitting device irradiates the sheet with light to read the image and the light emitting device which has reached a turn position moves in a direction opposite to the image reading direction,
wherein the light emitting device is capable of irradiating a first size sheet and a second size sheet with light to read the image, a length of the second size sheet being longer than the first size sheet in the image reading direction,
wherein the controller is configured to execute a control of changing the turn position among a plurality of positions including a first position and a second position downstream in the image reading direction of the first position in case that the light emitting device irradiates the first size sheet with light to read the image thereof, and
wherein the controller is configured to execute a control of turning the light emitting device at a position downstream in the image reading direction of the first position in case that the light emitting device irradiates the second size sheet with light to read the image thereof.

2. The image reading apparatus according to claim 1, wherein the first position is set to be within a reading area of the second size sheet.

3. The image reading apparatus according to claim 1, further comprising a size information acquiring portion,
wherein the controller is configured to execute a control of changing the turn position among a plurality of positions if the sheet is judged to be a first size sheet from information obtained from the size information acquiring portion.

4. The image reading apparatus according to claim 1, further comprising a memory storing information on the first and second positions,
wherein the controller is configured to execute a control of changing the turn position among a plurality of positions based on information stored in the memory.

5. The image reading apparatus according to claim 1, further comprising a counter configured to count a number of reading times by which an image of a sheet is read by moving the light emitting device,
wherein the controller is configured to execute a control of changing the turn position among a plurality of positions based on count information of the counter.

6. The image reading apparatus according to claim 1, further comprising a random number generator,
wherein the controller is configured to execute a control of changing the turn position among a plurality of positions based on a random number generated by the random number generator.

7. The image reading apparatus according to claim 1, wherein the controller is configured to change a turn position of the light emitting device among the plurality of positions every time when the sheet of the first size is read by a predetermined number of times by moving the light emitting device.

8. The image reading apparatus according to claim 7, wherein the predetermined number of times is one time.

9. The image reading apparatus according to claim 1, wherein the second size sheet is a maximum size sheet whose image can be read by moving the light emitting device, and
wherein the second position is a same position with a third position which is a turn position of the light emitting device in case that the light emitting device is moved in the image reading direction to read the second size sheet.

10. The image reading apparatus according to claim 1, wherein the second size sheet is a maximum size sheet whose image can be read by moving the light emitting device, and
wherein the controller is configured to set the turn position of the light emitting device at a same position in case that the light emitting device is moved in the image reading direction to read the second size sheet.

11. The image reading apparatus according to claim 1, wherein the guide member is formed of resin integrally with a body of the image reading apparatus.

12. The image reading apparatus according to claim 1, wherein the plurality of positions are the first and second positions, and wherein the controller is configured to stop and turn the light emitting device selectively at the first or second position in reading the image formed on the first size sheet.

13. An image reading apparatus comprising:

a light emitting device configured to irradiate a sheet with light to read an image on the sheet while moving in an image reading direction;

a motor configured to move the light emitting device;

a guide member configured to guide the move of the light emitting device in the image reading direction while being in sliding-contact with the light emitting device, a part of the guide member in sliding-contact with the light emitting device being formed of synthetic resin;

a controller configured to control the motor such that the light emitting device moves in the image reading direction in case that the light emitting device irradiates the sheet with light to read the image and the light emitting device which has reached a turn position moves in a direction opposite to the image reading direction; and a memory configured to store information of the turn position, the turn position including a first position, a second position downstream in an image reading direction of the first position, and a third position downstream in the image reading direction of the first position, wherein the controller is configured to judge whether size of the sheet irradiated with light by the light emitting device to read an image is the first size sheet or a second size sheet whose length in the image reading direction is longer than the first size sheet, wherein the controller is configured to execute a control of turning the light emitting device based on information on the first and second positions stored in the memory in case that the controller determines such that the light emitting device irradiates the first size sheet with light to read an image thereof, and wherein the controller executes a control of turning the light emitting device based on information on the third position in case that the controller determines such that the light emitting device irradiates the second size sheet with light to read an image thereof.

14. An image forming apparatus comprising:

the image reading apparatus as set forth in claim 1; and an image forming unit configured to form an image based on image information of a sheet read by the image reading apparatus.

* * * * *